(12) United States Patent
Iwasaki et al.

(10) Patent No.: US 7,551,343 B2
(45) Date of Patent: Jun. 23, 2009

(54) MAGNETO-OPTICAL DEVICE AND MANUFACTURING METHOD THEREOF

(75) Inventors: Katsuhiro Iwasaki, Shizuoka (JP); Hiromitsu Umezawa, Aichi (JP)

(73) Assignee: FDK Corporation, Tokyo (JP)

( * ) Notice: Subject to any disclaimer, the term of this patent is extended or adjusted under 35 U.S.C. 154(b) by 106 days.

(21) Appl. No.: 11/886,213

(22) PCT Filed: Feb. 24, 2006

(86) PCT No.: PCT/JP2006/303411
§ 371 (c)(1),
(2), (4) Date: Oct. 15, 2007

(87) PCT Pub. No.: WO2006/098131
PCT Pub. Date: Sep. 21, 2006

(65) Prior Publication Data
US 2008/0218841 A1 Sep. 11, 2008

(30) Foreign Application Priority Data
Mar. 16, 2005 (JP) ............................. 2005-074772

(51) Int. Cl.
*G02F 1/09* (2006.01)
(52) U.S. Cl. .................................... 359/282; 359/280
(58) Field of Classification Search .......... 359/280–284
See application file for complete search history.

(56) References Cited
U.S. PATENT DOCUMENTS
5,473,466 A 12/1995 Tanielian et al.

FOREIGN PATENT DOCUMENTS
JP 2003-315756 A 11/2003
JP 2004-294579 A 10/2004
JP 2005-221841 A 8/2005

*Primary Examiner*—William C Choi
(74) *Attorney, Agent, or Firm*—Harness, Dickey & Pierce, PLC

(57) ABSTRACT

A magneto-optical device is provided with a non-magnetic substrate, a magneto-optical crystal embedded in recessed portions formed in the surface of the non-magnetic substrate at positions where pixels are to be located, and a partitioning wall monolithic with the non-magnetic substrate and magnetically separating the magneto-optical crystal from each other at the position of a gap between the pixels, wherein the entire surface of the magneto-optical device is flattened. A method for manufacturing a magneto-optical device includes a digging down step, executed at positions where pixels are to be located, of digging down into the surface of a non-magnetic substrate in advance at the positions where the pixels are to be formed, so that a gap portion located between the pixels and around the dug areas remains to form a partitioning wall, a magnetic film forming step of forming a film made of a magneto-optical crystal over substantially the entire surface of the non-magnetic substrate, and a surface flattening step of performing flattening by removing a protruded portion formed by the magnetic film that has grown on the gap portion.

8 Claims, 5 Drawing Sheets

(AFTER POLISHING)

(IMMEDIATELY AFTER FORMING THE FILM)

MAGNETO-OPTICAL DEVICE AND MANUFACTURING METHOD THEREOF

TECHNICAL FIELD

The present invention relates to a magneto-optical device and a manufacturing method thereof that utilize the Faraday effect.

BACKGROUND ART

Magneto-optical devices utilizing magnetic films include an optical isolator, an optical switch and the like in the optical communication field and a magneto-optical spatial light modulator (MOSLM) and the like in the optical information processing field. A magneto-optical spatial light modulator is a magneto-optical device that spatially modulates the amplitude, the phase, and the state of polarization of a light beam by utilizing the Faraday effect of a magnetic film, and the modulator is recently expected to be applied to hologram recording, various displays, etc.

To parallel-process a light beam, the above magneto-optical spatial light modulator is configured such that multiple pixels (cells) of which the direction of magnetization of each magnetic film can be independently controlled are arranged in a two-dimensional array. The operation of each of the pixels will be described referring to FIG. 5. An incident light beam that has been plane-polarized after passing through a first polarizer 10 enters each pixel 12 of the magneto-optical spatial light modulator. The incident light beam passes through a transparent substrate 14 such as an SGGG (Substituted Gadolinium Gallium Garnet) substrate and a magnetic film 16, is reflected on a metal film 18, again passes through the magnetic film 16 and the transparent substrate 14, and exits out. At this point, due to the Faraday effect of the magnetic film 16, the direction of the polarization of the light beam returning back after passing through each pixel 12 and being reflected is rotated by a predetermined angle. In this case, assuming that a Faraday rotation of $+\theta_F$ (for example, +45°) is generated when a magnetic field (+H) in the positive direction is applied to a pixel in the upper row, a Faraday rotation of $-\theta_F$ (for example, −45°) is generated when a magnetic field (−H) in the negative direction is applied to a pixel in the lower row. These reflected light beams reach a second polarizer 20. When the polarizing transmitting face of the second polarizer is set at +45°, the light beam in the upper row that has been Faraday-rotated by +45° passes through the second polarizer 20 (the light is "ON"), but the light beam in the lower row that has been Faraday-rotated by −45° is blocked by the second polarizer 20 (the light is "OFF"). In this manner, "ON" and "OFF" of the reflected beam by each pixel can be controlled by controlling the direction of the magnetic field applied to each pixel.

In the magneto-optical spatial light modulator, each pixel is not an individual device that is completely independent as a pixel. In practice, an integrated structure is employed that is manufactured by growing a magnetic film over the entire surface of a substrate using the LPE (Liquid Phase Epitaxy) method, etc., and magnetically partitioning the magnetic film into multiple pixels. This is because each pixel needs to be very small and to be arranged accurately and densely. Therefore, a structure needs to be employed that an arbitrary pixel does not influence other adjacent pixels in terms of flux reversal of each pixel.

A method of digging a gap at a position between the pixels of the magnetic film formed on the substrate surface is common as the method of separating each pixel securely and magnetically. More specifically, a groove is formed by dry etching or wet etching as the gap. However, such a separating structure has caused a significant problem in terms that it will become difficult to achieve multi-layering (it will become difficult to wire driving lines) when this device is used as a magneto-optical spatial light modulator because unevenness is generated on the surface. That is, this unevenness may increase the resistance value of the driving line, and in an extreme case, disconnection may occur.

To flatten such an uneven surface, covering the surface with a flattening material such as a polymer can be considered. However, this kind of flattening material is hard to be employed because the material shrinks by heat when it is baked, and therefore, the magnetic property of the pixels may be varied (more specifically, the coercive force may be increased).

In addition, for example, U.S. Pat. No. 5,473,466 discloses a technique that: a film pattern that can be oxidized is formed with, for example, silicon (Si) at the position of each pixel on a magnetic garnet material; the magnetic garnet material just beneath the Si film is reduced and transformed by heat-treating the entire work; and, thereby, flux reversal is enabled for each pixel. However, when the entire magnetic garnet material is heat-treated using a film that can be oxidized such as Si, the periphery of the Si film is also reduced due to thermal diffusion. Therefore, the outline of each pixel becomes vague and size variation of the pixel is also caused. Therefore, the distance between pixels must be made long. As the gap length between pixels becomes longer, the amount of information per unit area is reduced. Therefore, this device is not suitable for a use that processes a large amount of information at a high speed.

DISCLOSURE OF INVENTION

The object of the present invention is to provide a magneto-optical device that is structured such that a magneto-optical crystal of each pixel is completely separated magnetically, and the entire surface thereof is flat, and a manufacturing method thereof.

An aspect of the present invention provides a magneto-optical device including: a non-magnetic substrate; a magneto-optical crystal embedded in recessed portions formed in a surface of the non-magnetic substrate at positions where pixels are to be located; and a partitioning wall that is monolithic with the non-magnetic substrate and that magnetically separates the magneto-optical crystal from each other at a position of a gap between the pixels, wherein the entire surface of the magneto-optical device is flattened.

The magneto-optical device is, for example, a magneto-optical spatial light modulator having multiple magneto-optical crystals, which serve as the pixels, arranged densely therein in a two-dimensional array. An SGGG or a GGG (Gadolinium Gallium Garnet) single crystal substrate can be used as the non-magnetic substrate. A rare-earth iron garnet single crystal can be typically employed as the magneto-optical crystal.

Another aspect of the present invention provides a manufacturing method of a magneto-optical device, including: a digging down step, executed at positions where pixels are to be located, of digging down into a surface of a non-magnetic substrate in advance at the positions where the pixels are to be formed, so that a gap portion located between the pixels and around areas that have been dug remains to form a partitioning wall; a magnetic film forming step of forming a film made of a magneto-optical crystal over substantially the entire surface of the non-magnetic substrate; and a surface flattening step of performing flattening by removing a protruded portion formed by the magnetic film that has grown on the gap portion, wherein a plurality of the magneto-optical crystals are embedded respectively in recessed portions formed in the surface of the non-magnetic substrate, and the magneto-optical crystals are magnetically separated from each other by the partitioning wall that is monolithic with the non-magnetic substrate.

For example, an SGGG or a GGG single crystal substrate is used as the non-magnetic substrate; a rare-earth iron garnet single crystal is used as the magneto-optical crystal; and the film can be formed using the liquid phase epitaxial method or the sputtering method. After the magnetic film has been epitaxial-grown, the film is heat-treated at 900° C. to 1,150° C. in an oxidizing atmosphere, and thereby, the coercive force can be reduced.

Figure 1:
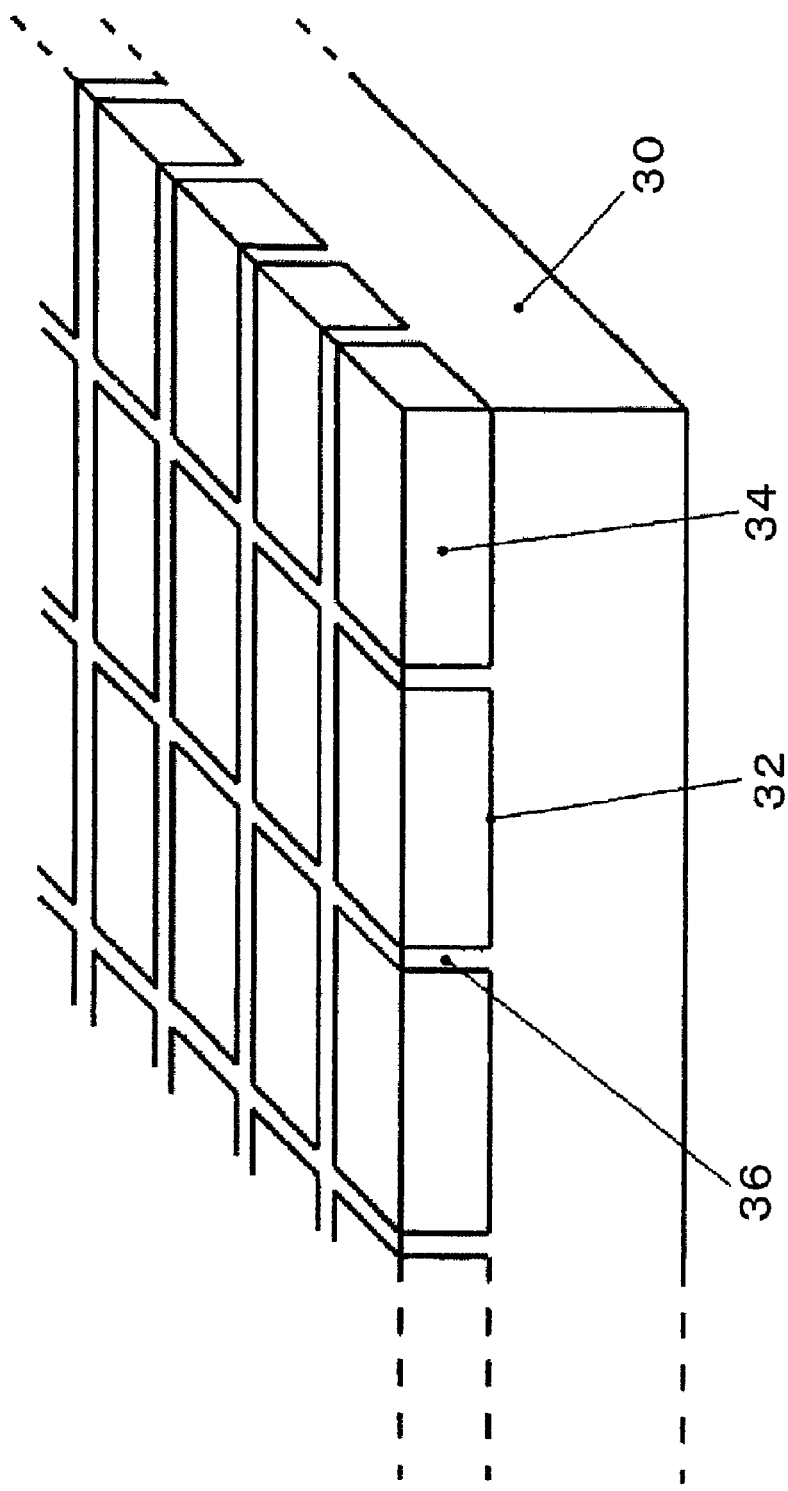
FIG. 1 is an explanatory diagram of an example of a magneto-optical device according to the present invention.

DESCRIPTION OF THE REFERENCE NUMERALS 30 non-magnetic substrate
32 recessed portion
34 magneto-optical crystal
36 partitioning wall

DETAILED DESCRIPTION OF THE INVENTION

FIG. 1 is an explanatory diagram of an example of a magneto-optical device according to the present invention. The invention is structured such that: each magneto-optical crystal 34 is embedded in each recessed portion 32 formed at each pixel position on the surface of a non-magnetic substrate 30; the magneto-optical crystals 34 are magnetically separated by a partitioning wall 36 that is monolithic with the non-magnetic substrate at the position of a gap between the pixels; and the entire surface is flattened. The magneto-optical crystals 34, which are independent from each other, serve as pixels (cells) respectively.

The above structure can be manufactured by undergoing the three steps of: a digging down step, executed at positions where pixels are to be located, of digging down into the surface of the non-magnetic substrate (for example, an SGGG or a GGG single crystal substrate) in advance at the positions where the pixels are to be formed to a depth deeper than the thickness of a necessary magnetic film (magneto-optical crystal), so that a gap portion between the pixels and around the dug areas remains to form a partitioning wall; a magnetic film forming step of forming a film made of a magneto-optical crystal (for example, a rare-earth iron garnet single crystal) over substantially the entire surface of the non-magnetic substrate; and a surface flattening step of performing flattening by removing protruded portions formed by the magnetic film that has grown on the gap portions.

The non-magnetic substrate at the pixel positions is dug down in advance more deeply than the thickness of the magnetic film to be epitaxial-grown. By liquid-phase-epitaxial growing the film on the surface of the non-magnetic substrate having the above shape, the structure can be manufactured such that the partitioning wall which is monolithic with the non-magnetic substrate is formed in the gap portion between the pixels. At this point, the magnetic film is also grown at the position of the gap on the non-magnetic substrate and, after growth, a protrusion structure similar to that of the underlying non-magnetic substrate is generated. However, this protruded portion can be removed by etching or polishing after flattening with a flattening material. Therefore, the magnetic films (the magneto-optical crystals) at the pixel positions are finally completely separated magnetically and a two-dimensional magnetic pixel array with a flat surface can be manufactured. Even when the etching is executed after flattening with the flattening material, the flattening material is finally removed and, therefore, the flattening material does not adversely affect the magnetic property of the pixels.

FIGS. 2A to 2F depict an example of manufacturing steps of a magneto-optical device according to the present invention. This is an example of an application to the manufacture of a magneto-optical spatial light modulator, which includes the following process steps.

Figure 2A:
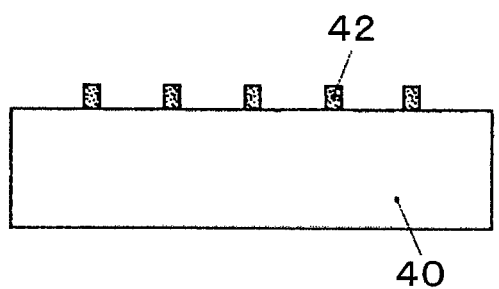
FIGS. 2A to 2F are explanatory diagrams of an example of manufacturing steps of the magneto-optical device according to the present invention.

FIG. 2A: Patterning of a tetragonal lattice is executed on an SGGG substrate 40 of which the surface is in (111) orientation with photoresists 42 using the photolithography technique. Multiple rectangular micro areas to which no photoresist is adhered are respectively the positions where the pixels are to be formed.

Figure 2B:
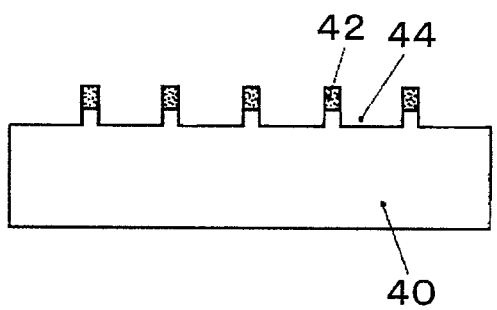

FIG. 2B: Multiple rectangular recessed portions 44 are dug using ion milling such that a step of 1.0 μm is formed in the SGGG substrate 40 at each of the positions where the pixels are to be formed.

Figure 2C:
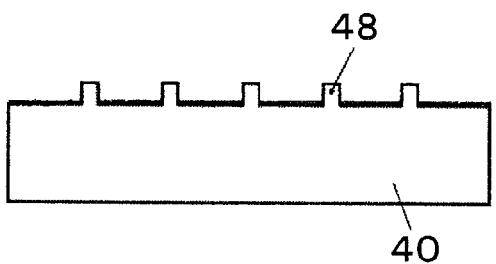

FIG. 2C: The photoresists remaining on the surface are removed. Thereby, it is possible to obtain a SGGG substrate 40 having a surface structure in which the positions where the pixels are to be formed are dug by 1.0 μm and, in contrast, the positions of the gaps between pixels are protruded by 1.0 μm. The protruded portion at the position of the gap between the pixels becomes a partitioning wall 48.

Figure 2D:
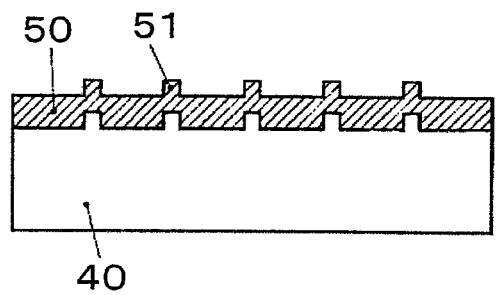

FIG. 2D: On the SGGG substrate 40 which the surface thereof has been processed as above, a Bi-replaced iron garnet thin film 50 is grown using the liquid phase epitaxial method. The film thickness to be grown is assumed to be 3.0 μm. The surface at this time shows a structure that has protruded portions 51 similar to those of the underlying SGGG substrate, and the step height of each portion 51 is 1.0 μm.

Figure 2E:
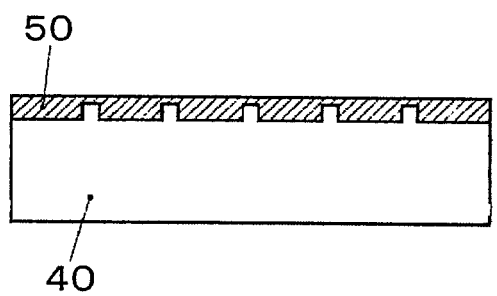

FIG. 2E: Thereafter, by polishing the surface, the protruded portions that have appeared on the magnetic film are shaved, and a flat surface is produced.

Figure 2F:
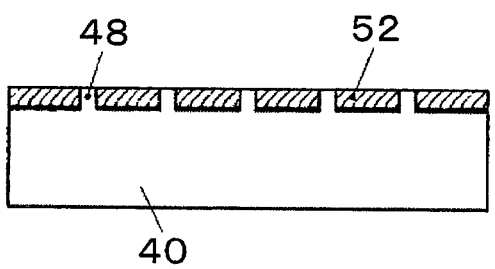

FIG. 2F: The entire surface is shaved using ion milling, and this shaving is stopped when the magnetic film at the position of the gap is removed. Thereby, the Bi-replaced iron garnet single crystals 52 that are to serve as the pixels are embedded in the recessed portions 44 of the SGGG substrate 40, the partitioning wall 48 that is monolithic with the substrate is provided at the position of the gap between the pixels, and, thereby, the complete magnetic separation is achieved between the pixels.

Figure 3B:
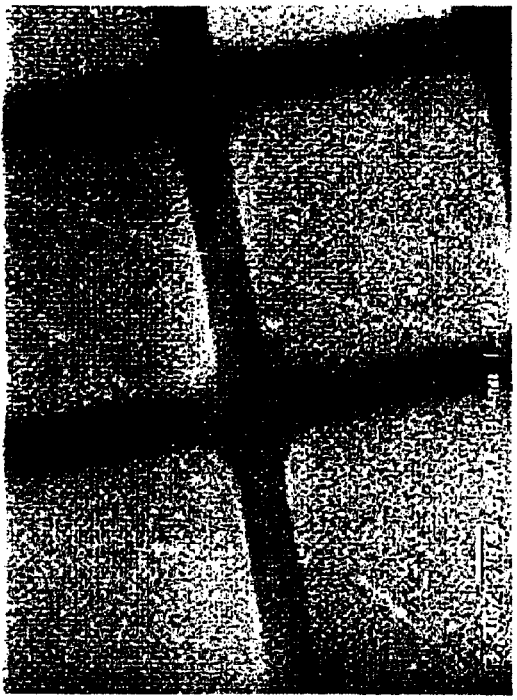
FIGS. 3A and 3B depict SEM photos of the surface of a prototype.
Figure 3A:
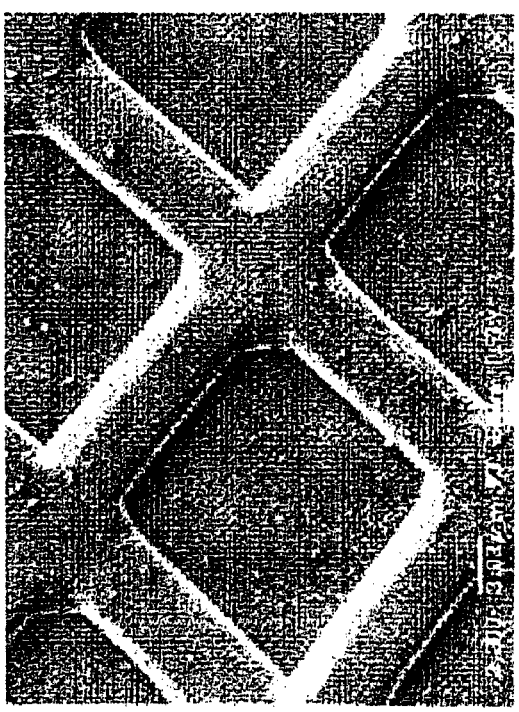

FIGS. 3A and 3B depict SEM photos of the surface of a prototype. FIG. 3A depicts the state immediately after the magnetic film has been grown. The unevenness of the underlying substrate reflects on the surface of the magnetic film, and a step of 1 μm has appeared. In contrast, FIG. 3B depicts the state where the magnetic film above the position of the gap is completely removed by polishing and etching. It can be seen from the photos that the surface is flattened.

Figure 4:
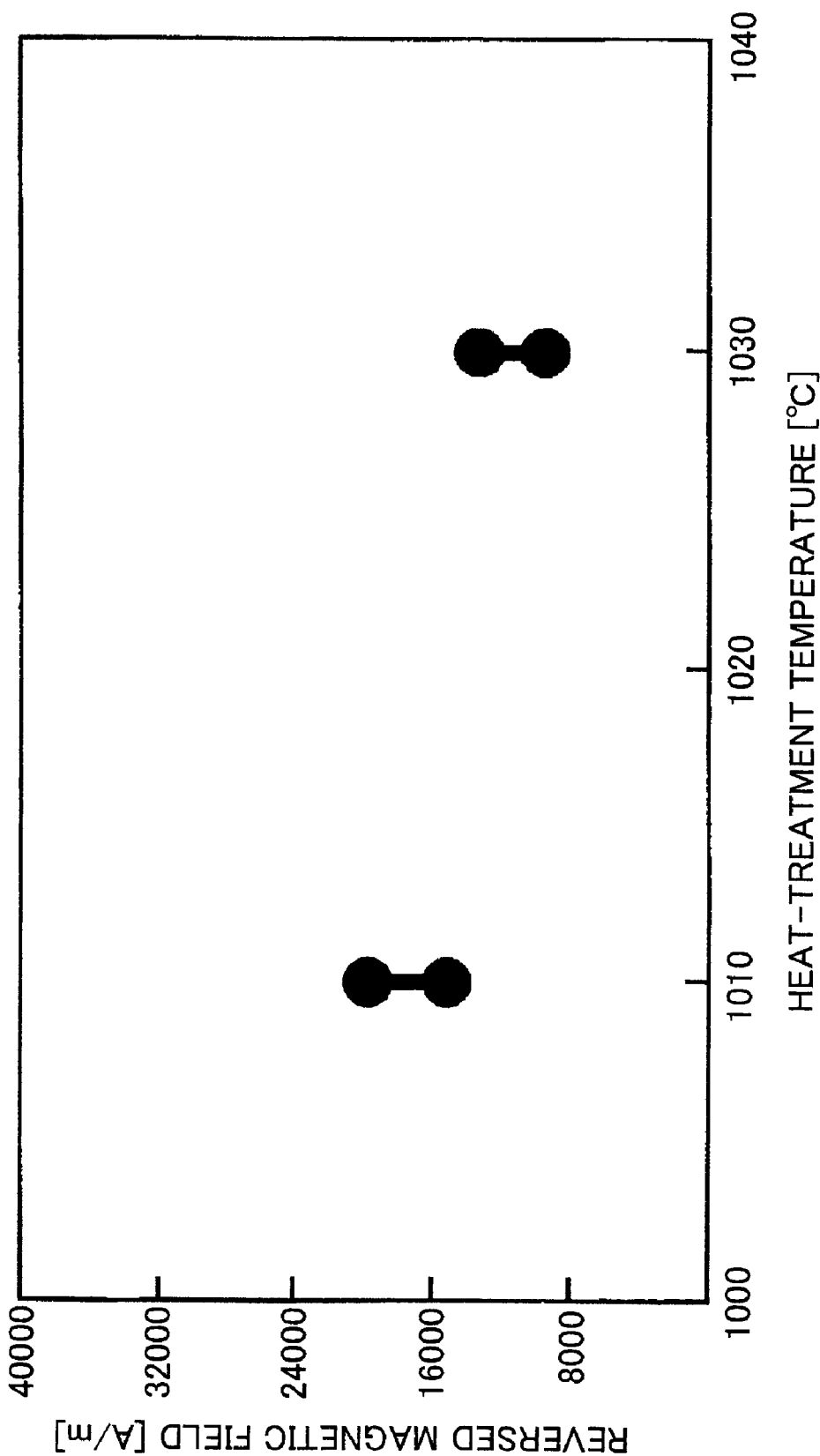
FIG. 4 depicts a graph showing a variation of the magnetic property caused by a heat treatment.
Figure 5:
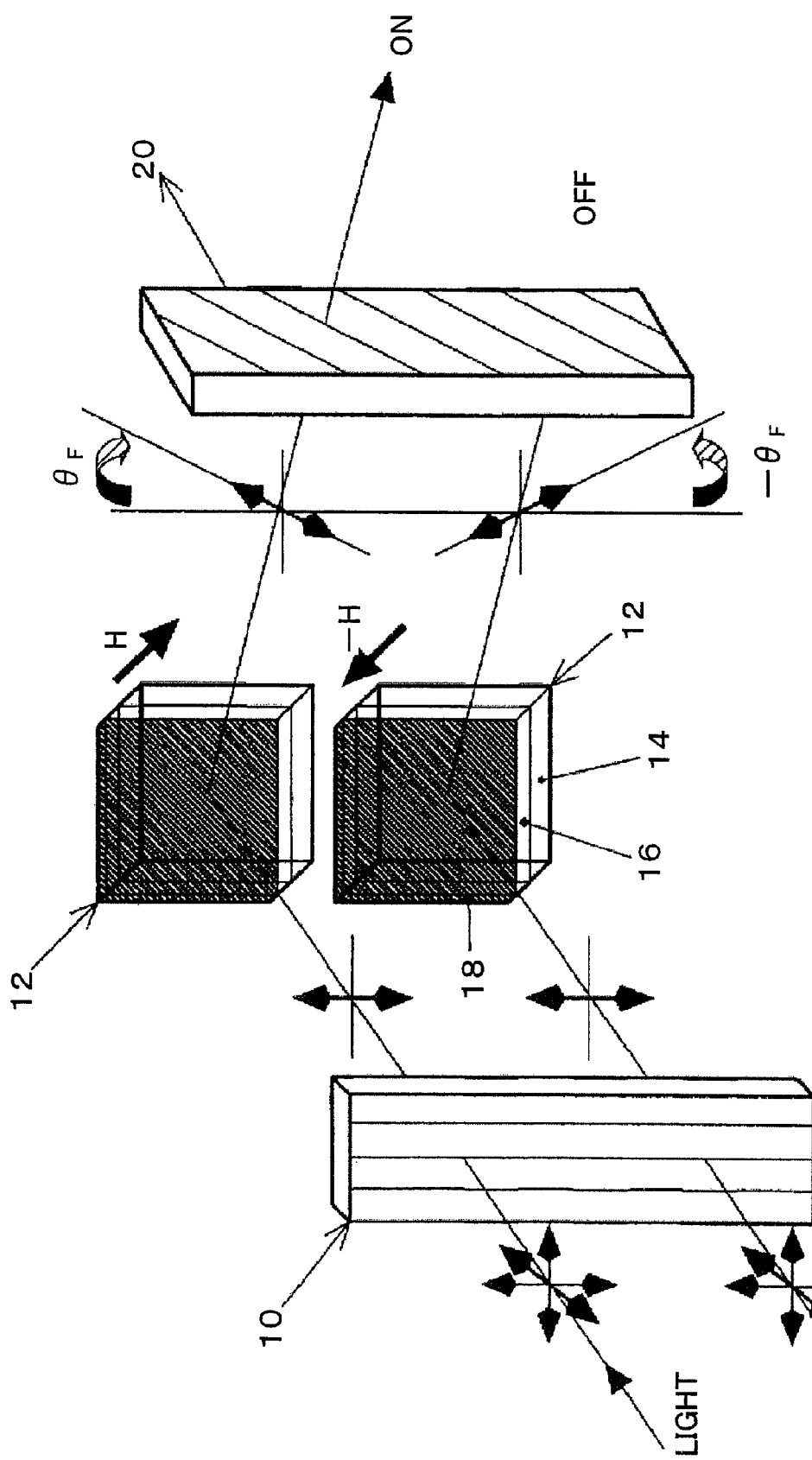
FIG. 5 is an explanatory diagram of operations of a magneto-optical spatial light modulator.

The Bi-replaced iron garnet single crystal thin film in the state where the film has been formed using the liquid phase epitaxial method has a coercive force that is too strong (>40,000 [A/m]) when no additional process is applied to the film, and a large driving current is necessary for the flux reversal of the pixels. Therefore, after the magnetic film has been epitaxial-grown (after the surface has been flattened in the step of FIG. 2F), the film is heat-treated at 900° C. to 1,150° C. in an oxidizing atmosphere. Thereby, the magnetic field necessary for the flux reversal of each pixel can be reduced, and the driving current can also be reduced. FIG. 4 depicts the state where the reversed magnetic field of the pixels is reduced by the heat-treatment in the atmosphere.

The invention claimed is:

1. A magneto-optical device comprising:
   a non-magnetic substrate;
   a magneto-optical crystal embedded in recessed portions formed in a surface of the non-magnetic substrate at positions where pixels are to be located; and
   a partitioning wall that is monolithic with the non-magnetic substrate and that magnetically separates the magneto-optical crystal from each other at a position of a gap between the pixels,
   wherein the entire surface of the magneto-optical device is flattened.

2. The magneto-optical device of claim 1, wherein the magneto-optical device is a magneto-optical spatial light modulator having multiple magneto-optical crystals that serve as the pixels and that are arranged densely in a two-dimensional array.

3. The magneto-optical device of claim 2, wherein the non-magnetic substrate is an SGGG or a GGG single crystal substrate, and the magneto-optical crystals are rare-earth iron garnet single crystals.

4. The magneto-optical device of claim 1, wherein the non-magnetic substrate is an SGGG or a GGG single crystal substrate, and the magneto-optical crystal is a rare-earth iron garnet single crystal.

5. A method for manufacturing a magneto-optical device comprising:
   a digging down step, executed at positions where pixels are to be located, of digging down into a surface of a non-magnetic substrate in advance at the positions where the pixels are to be formed, so that a gap portion located between the pixels and around areas that have been dug remains to form a partitioning wall;
   a magnetic film forming step of forming a film made of a magneto-optical crystal over substantially the entire surface of the non-magnetic substrate; and
   a surface flattening step of performing flattening by removing a protruded portion formed by the magnetic film that has grown on the gap portion,
   wherein a plurality of the magneto-optical crystals are embedded respectively in recessed portions formed in the surface of the non-magnetic substrate, and the magneto-optical crystals are magnetically separated from each other by the partitioning wall that is monolithic with the non-magnetic substrate.

6. The method for manufacturing the magneto-optical device of claim 5, wherein the non-magnetic substrate is an SGGG or a GGG single crystal substrate, and the magneto-optical crystals are rare-earth iron garnet single crystals and are formed into a film using a liquid phase epitaxial method or a sputtering method.

7. The method for manufacturing the magneto-optical device of claim 6, wherein the coercive force of the magneto-optical crystals is reduced by heat-treating the film at 900° C. to 1,150° C. in an oxidizing atmosphere after forming the magnetic film.

8. The method for manufacturing the magneto-optical device of claim 5, wherein coercive force of the magneto-optical crystals is reduced by heat-treating the film at 900° C. to 1,150° C. in an oxidizing atmosphere after forming the magnetic film.

* * * * *